United States Patent [19]

Brunner et al.

[11] Patent Number: 4,939,701
[45] Date of Patent: Jul. 3, 1990

[54] METHOD AND APPARATUS FOR ERROR REDUCTION WHEN MEASURING MOVEMENT IN SPACE OF TEST POINTS BY MEANS OF ULTRASONIC SIGNALS

[76] Inventors: Wolfgang Brunner; Ludwig von Zech, both of Ringenberg 175, D-8999 Maierhoefen, Fed. Rep. of Germany

[21] Appl. No.: 230,335

[22] Filed: Aug. 9, 1988

[30] Foreign Application Priority Data

Aug. 20, 1987 [DE] Fed. Rep. of Germany ....... 3727837

[51] Int. Cl.$^5$ ............................................. G01S 15/74
[52] U.S. Cl. ...................................... 367/128; 367/122; 342/52
[58] Field of Search ................. 367/2, 6, 93, 118, 122, 367/127, 128; 342/52, 53, 54, 129

[56] References Cited

U.S. PATENT DOCUMENTS

| | | | |
|---|---|---|---|
| 4,026,654 | 5/1977 | Beaurain | 367/6 X |
| 4,105,990 | 8/1978 | Rines et al. | 367/128 X |
| 4,207,571 | 6/1980 | Passey | 367/128 X |
| 4,313,183 | 1/1982 | Saylors | 367/128 |
| 4,751,689 | 6/1988 | Kobayashi | 367/127 |

FOREIGN PATENT DOCUMENTS

2049136 4/1972 Fed. Rep. of Germany .
2877084 5/1976 Fed. Rep. of Germany .

Primary Examiner—Thomas H. Tarcza
Assistant Examiner—Tod Swann
Attorney, Agent, or Firm—Burgess, Ryan and Wayne

[57] ABSTRACT

With the measurement of spatial movement of test points by means of ultrasonic signals, the problem exists that often interferences occur which may lead to distortion of test results. It is proposed to check the space between sound transmitter and sound receiver by means of electromagnetic waves, in particular light waves, for absence of obstacles, and/or not to use for the derivation of the distances those ultrasonic signals whose transit time and/or amplitude lie outside a given expectancy range, but to discard them.

24 Claims, 6 Drawing Sheets

METHOD AND APPARATUS FOR ERROR REDUCTION WHEN MEASURING MOVEMENT IN SPACE OF TEST POINTS BY MEANS OF ULTRASONIC SIGNALS

BACKBROUND OF THE INVENTION

The invention relates to a method of reducing errors when measuring movement in space of test points by means of ultrasonic signals and to an apparatus for carrying out said method.

In medicine, in particular rehabilitation medicine and sports medicine, but also in orthopedics and neurology, it is often of interest to perform analyses of the human body movements. In this connection, it is important to be able to measure and record the movement of body parts relative to each other and to the surroundings (to the ground) exactly and without interference. Photographic methods (film, video) have a very restricted usefulness for the analysis of movements as each picture must be plotted separately and be entered as a digital value to the analysis apparatus, namely a computer. Moreover, these methods are relatively slow. From DE-PS Nos. 3406179 and 3406180, devices for localization of a test point have been described where the test points may be applied on a person or on models. If, for instance, one wishes to measure the arm movements of a runner relative to the body, the problem arises in the practice with the known arrangements that during running, the arm moves past the sound transmitters which are attached to the body. This causes interferences of the sound signals to occur which lead to a distortion of the measurement result. This is just one example of the possible obstacles that can get into the sound path between transmitters and receivers.

OBJECTS AND SUMMARY OF THE INVENTION

With the aforesaid state of the art as a point of departure, it is the object of the present invention to develop methods and apparatus of the initially mentioned kind to the effect that disturbances of test results are reduced.

The solution of the problem may consist, therefore, in that the sound path between sound transmitter and sound receiver is scanned and monitored through light (pulses) and the measured sound transit times are taken as a basis for further calculation only if the sound path is free at least for light. This means at the same time that the sound path is free also for the sound itself. In this manner, shadowing or diffraction phenomena that would lead to distortion or alteration of sound transit times can be detected reliably. Another possibility which could be utilized in addition to the above described measure, is to make use of the sound signals themselves to evaluate the "quality" of the second path. This can be done by evaluating the sound amplitude or respectively the attenuation of the sound in the sound path and then evaluating the signal as "defective" if the amplitude is not sufficient. Another possibility is to compare the transit time of the sound signal with an expectancy value and to discard those sound signals (not using them for further computation) which lies outside the expectancy range.

BRIEF DESCRIPTION OF THE DRAWINGS

Further features essential to the invention are evident from the following description of preferred forms of realization of the invention, which are explained more specifically with reference to illustrations, in which.

DETAILED DESCRIPTION OF THE PREFERRED EMBODIMENTS

Figure 1:
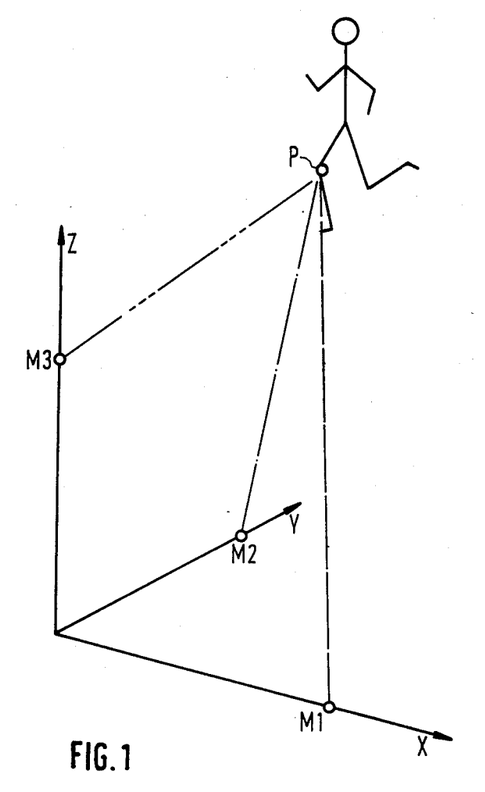
FIG. 1 shows a schematized representation of the test arrangement.

Essential to the invention is that, as shown in FIG. 1, a test point P, located on a moving object, is established or plotted relative to the surrounding that is, to the space coordinates x, y and z. To this end (at least), three test sites M1 to M3 are established which are spaced from each other in all three coordinates. For the obtaining of the measurands, reference is hereby expressly made to DE-PS No. 3406179, which contains all information necessary for reenactment.

Now either the sound can be radiated from the test sites M1 to M3 and be received at the test point P, or the opposite sound direction may be chosen. In the former case, corresponding sound receivers would then have to be arranged at the test site P, the received signal must be supplied thence to the computer unit for evaluation of the signals. While this arrangement is possible in special cases, generally the opposite sound direction—sound radiation at test point P and sound reception at test sites M1 to M3—will be chosen. The latter case is taken as basis in all further treatments but the reverse direction of sound propagation is always possible.

Figure 2A:
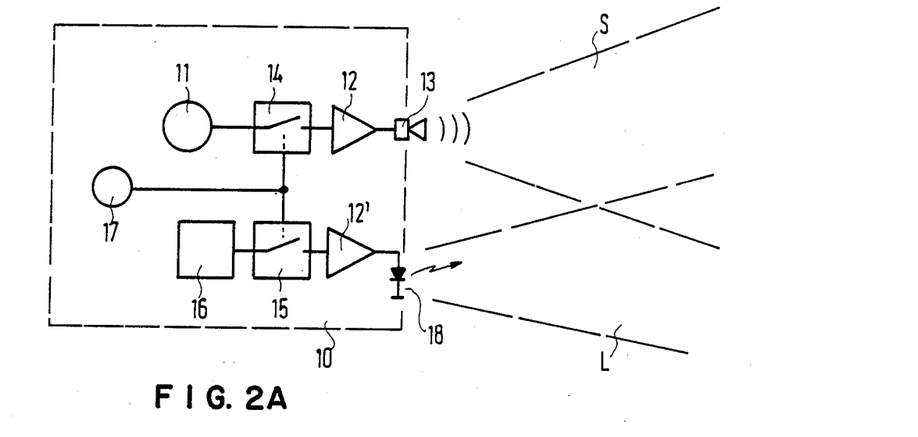
FIGS. 2a-2b, a block diagram of a first form of realization of the transmitter and receiver.
Figure 2B:
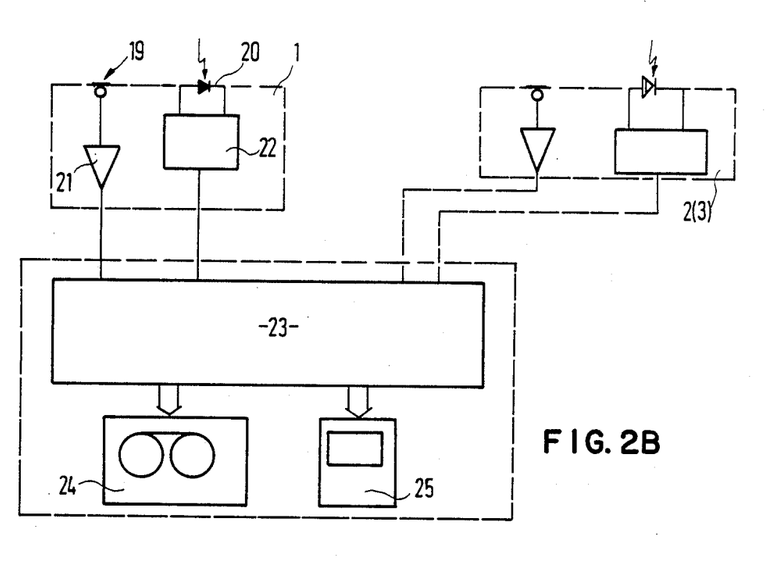

In the preferred form of realization of the invention shown in FIG. 2, each sound transmitter 10, to be disposed at a test point P, comprises an oscillator 11 which generates a correspondingly high (ultrasonic) frequency and is connected via an electronic switch 14 to the input of a power amplifier 12 which, via its output, activates a sound transducer 13, e.g. a piezoelectric transducer. The piezoelectric transducer 13 then radiates a sound signal S, namely with a directional characteristic determined by the sound transducer 13, as indicated in broken lines in FIG. 2.

Switch 14 is activated through a clock generator 17, so that sound pulses are radiated with a defined duration and at regular intervals. Further, the clock generator 17 activates a further electronic switch 15, which sends an electric signal to the input of a further power amplifier 12' through whose output a light transmitter 18, e.g. an (infrared) light-emitting diode, is activated. The sound signal and light pulse are thus emitted synchronously. In the simplest case, the light signal may be a light pulse of the same duration as the radiated ultrasonic signal. In the preferred embodiment of the invention shown in FIG. 2, however, the light signal is modulated via a code generator 16, so that when using several transmitters 10 (at different test points P), each transmitter 10 may have associated with it an individual marking with respect to the radiated light pulse. When a light signal is received, it can then be decided to which transmitter 10 this light signal belongs.

The radiated sound signals are received via at least three measurement receivers 1 to 3, each comprising a microphone 19 with a connected preamplifier 21 as well as a light receiver 20 with connected signal converter 22. The amplified or respectively converted sound/light signals are supplied to a computer unit 23, in which the (analog) signals are digitalized and further processed. The processed result can then be recorded in a recording unit 24 and if desired, displayed at the same time on a screen 25. The computer unit 23 is to be understood as a minicomputer and contains the usual memory and computing circuits.

The operation of the arrangement shown in FIG. 2 is now as follows:

When (at a test point P) the clock generator 17 closes to two switches 14 and 15, ultrasonic and light signals are transmitted simultaneously. Both signals are pulsed, a sharp rising edge being especially important. The light signal L (see FIG. 2) gets without relevant delay to the light receivers 20 of the measurement receivers 1 to 3 and hence to the computer unit 23. The corresponding sound pulse gets to the microphones 19 and hence also to the computer unit 23 with a delay which depends on the distance between the transmitter 10 and the measurement receivers 1 to 3. Based on the known velocity of sound (which can be measured e.g. by means of a continuously operating calibrating device with a sound transmitter and a sound receiver at a fixed distance), it is possible to determine and to store in the computer unit 23, upon each reception of a sound pulse, the distance between transmitter 10 and each of the measurement receivers 1 to 3. In this manner, the relative position of the transmitter 10 to the receivers 1 to 3 is scanned point by point and stored.

At the same time, a sound pulse arriving at the microphone 19 is made use of in the computer unit (23) for evaluation of the distance measurement only if the light-pulse belonging to this sound pulse have arrived a corresponding period of time previously. What this means is that in this preferred embodiment of the invention, it is assumed that between the emission of the sound and the light pulses and the arrival of the sound pulse, no obstacle gets into the sound path between transmitter 10 and receivers 1 to 3. Further, it must be watched in this form of realization that the clock generator 17 actuates the switches 14 and 15 at greater intervals of time than correspond to the transit time of the sound pulses.

To eliminate the effect of reflections of the sound signal which could lead to an emitted sound signal arriving at the test site twice, it is of advantage if after arrival of a light pulse, the then current measuring process is terminated when the first sound pulse has arrived at the test site. The "observation window" is not opened again until after the next light pulse has arrived at the respective measurement receivers 1 to 3.

Figure 3A:
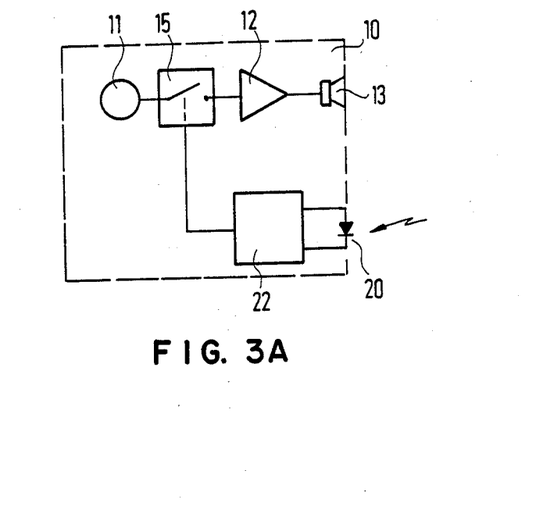
FIGS. 3a-3b, a second preferred form of realization of the transmitter and receiver.
Figure 3B:
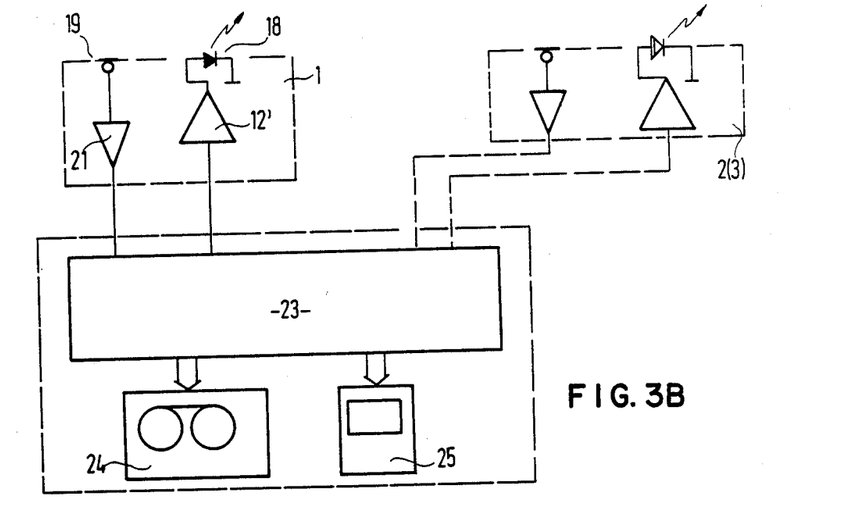

In a further preferred embodiment of the invention shown in FIG. 3, the radiation of a sound pulse is determined, not by a clock generator 17 disposed in the sound transmitter 10, but by a clock generator disposed in the computer unit 23. This clock generator triggers a light pulse which is emitted by a light transmitter 18 in each of the measurement receivers 1 to 3 and is received in a light receiver 20 disposed at the test point P or respectively in the sound transmitter 10. Here the computer unit 23 activates the light transmitters 18 of the three measurement receivers 1 to 3 in such a way that the light pulses are emitted with a short time stagger and are received at the light receiver 20 with the same stagger. The signal converter 22 contains a counting circuit which is designed so that the signal converter 22 delivers an output signal for closing the controllable switch 15 only after light pulses have been emitted by all measurement receivers 1 to 3. It is thus ensured that the sound paths between test point P and all three measurement receivers M1 to M3 are free. As soon as the signal converter closes the electronic switch 15, oscillator 11 is connected to the input of the power amplifier 12, so that the latter activates the converter 13 with a corresponding ultrasonic signal. Reception of the radiated ultrasonic signal occurs as described above, as does also the calculation of the transit times.

Figure 4A:
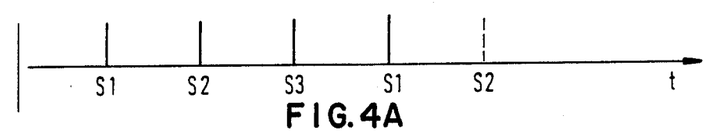
FIGS. 4a-4d, a diagram to explain a time window.

In the following, the mode of operation of the apparatus shown in FIG. 2 will be described more specifically with reference to FIG. 4, several transmitters 10 being provided in this case, the clock generators 17 of which run synchronously. Where three transmitters 10 are provided and their clock generators 17 are laid out so that the sound signals of the three transducers are radiated at equal intervals of time, there result output signals as shown in FIG. 4A.

Figure 4B:
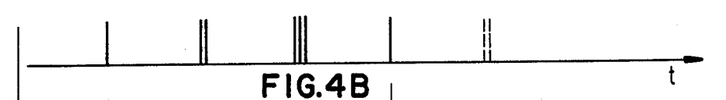

The code generators 16 of each transmitter 10 code the light signals differently, so that each transmitter 10 has assigned to it a differently coded light signal. This factual situation can be seen from FIG. 4B, the code being in this case very simply the number of pulses. The signals shown in FIG. 4B can also be described by the digital words 100, 110 and 111.

Figure 4C:
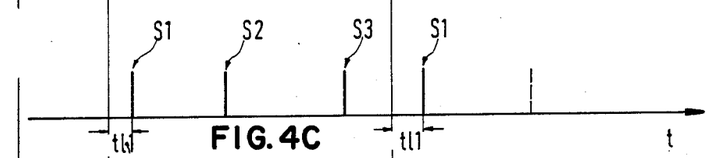
Figure 4D:
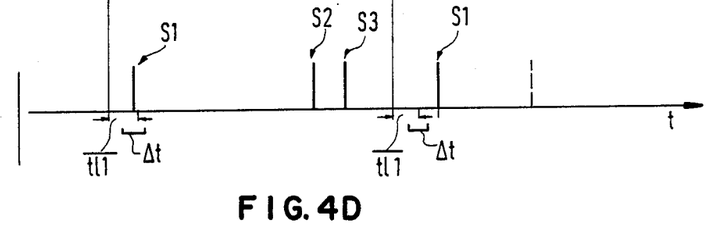

In FIG. 4C, the sound signals S1 to S3 are shown after transversing the space between test point and test site, that is, after a delay which is indicated for the signal S1 in FIG. 4C by tlI. In the course of several measurements during which the test object or respectively the test points belonging to it move(s), different transit times tlI are measured and a defined number of them summed for averaging. This is preferably done in that for each newly arriving measurand, a measurand that arrived n measurements earlier is substracted from the stored sum so that sliding averaging over the last n measurements is carried out.

It may be assumed that having set a defined maximum velocity of the test points (e.g. maximum speed of movement of a runner), the transit times of the sound signals always lie within a certain range $\Delta t$ around the previously determined mean value $\overline{tI}$. Now if a sound signal S1 arrives which lies within this range (FIG. 4C'-left), it is rates as "usable" and taken as a basis for further computation. But if the arriving sound signal S1 lies outside the range $\Delta t$ (FIG. 4C'-right), the signal is discarded, since it originates e.g. from a reflection of the ultrasonic signal, or perhaps from another signal (S2, S3) radiated later. In this manner, increased error immunity is achieved.

Another increase in error proofness (this may constitute an alternative solution) again comprises the sliding averaging, but in this case not with regard to the transit time to be expected but with regard to the anticipated sound amplitude. In this case, therefore, the mean sound amplitudes for each transmitter or respectively for each arriving signal would be formed, rating as faulty those arriving sound signals which lie outside a certain expectancy range around the mean value. Due to the fact that (in both cases) the sliding average is formed, a slow variation of the signal transit times or sound amplitudes can be taken into account which occurs upon continuous movement of the test object toward or away from the measurement receivers.

The above described amplitude threshold is formed in a further preferred embodiment of the invention (possibly in addition) through the amplitude of the received light signal, and here the arrangement needed for that purpose must in any event comprise the light transmitter 18 at the site of the sound transducer 13. For this arrangement, attention is paid furthermore to making the radiation characteristic (sound or light intensity over the solid angle) of sound transducer 13 and light transmitter 18 essentially the same. In this case, the illuminance at the test site must be a function of the received sound intensity and it must be taken into consideration here that the (distance-dependent) attenuation of the light is substantially less than that of the sound wave, so that via the distance and the sound attenuation factor, an additional factor enters into the calculation of the sound level to be expected.

Figure 5:
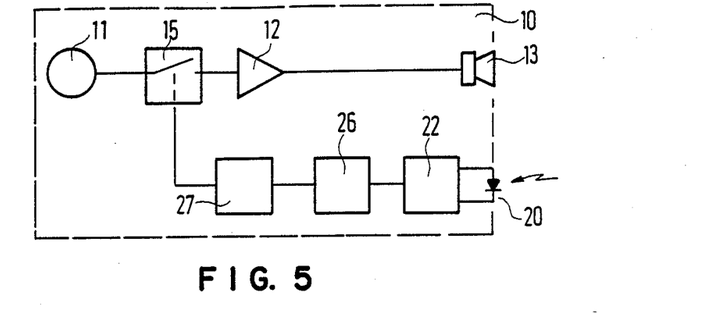
FIG. 5, a block circuit diagram of a further preferred realization of a transmitter.
Figures 6A, 6B, 6C:
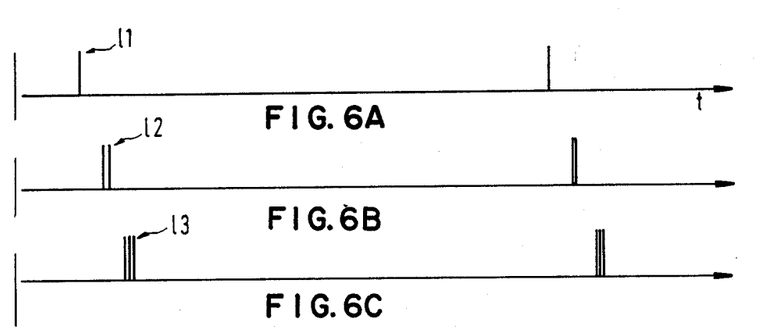
FIG. 6a-6f, a diagram to explain the mode of operation of the arrangement according to FIG. 5 and FIG. 7, a further preferred form of realization of a transmitter.
Figures 6D, 6E:
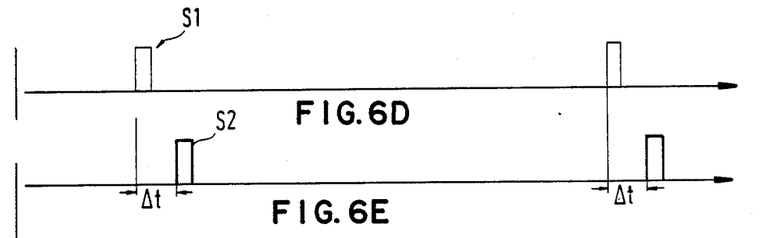
Figure 6F:
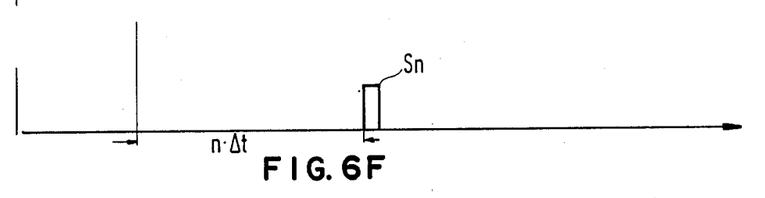

In the following, a further preferred embodiment of the invention which resembles that of FIG. 3 in its basic conception, will be described more specifically with reference to FIGS. 5 and 6.

In this preferred embodiment of the invention, the light receiver 20 again lies at the site of the transmitter 10, but the signal converter 22 is followed by a decoder 26. Inserted between the decoder 26 and the electronic switch 15 is a delay element 27. This form of realization of the invention is suitable for use for several transmitters 10, and each of the transmitters 10 then has a delay element 27 with a delay time different from all others.

Furthermore, by each measurement receiver 1 to 3 which includes a light transmitter 18, a differently coded light signal 11 to 13 is emitted, the transmission times being staggered relative to each other by defined amounts. This is shown in FIGS. 6a to 6C.

Now each decoder 26 in a transmitter 10 is designed so that a "start" signal appears at its output when a light signal 11 to 13 has been received from all three measurement receivers 1 to 3. The first delay element 27 of a first transmitter 10 is set to delay "0", the delay element 27 of a second transmitter 10 to the delay time $\Delta t$ (FIG. 6E). The nth receiver 10 then includes a delay element 27 whose delay time is $n \times \Delta t$. The respective sound signal Sn is then radiated delayed by the corresponding time relative to the first signal S1 (FIG. 6F). With this arrangement, an exact synchronization of the transmitters 10 is possible so that the above described error recognition measures can easily be taken. Moreover, the free sound path between transmitter and receiver is checked and a starting time for the determination of the sound transit times is defined. Lastly, an unambiguous identification of the "observed" sound source is possible in the same manner as in the embodiment according to FIG. 2, since, in the embodiment according to FIG. 5, each receiver 10 has a transmitting time assigned to it while in the embodiment according to FIG. 2, each transmitter radiates its identification mark via the coding unit 16 with the light pulse L itself.

Figure 7:
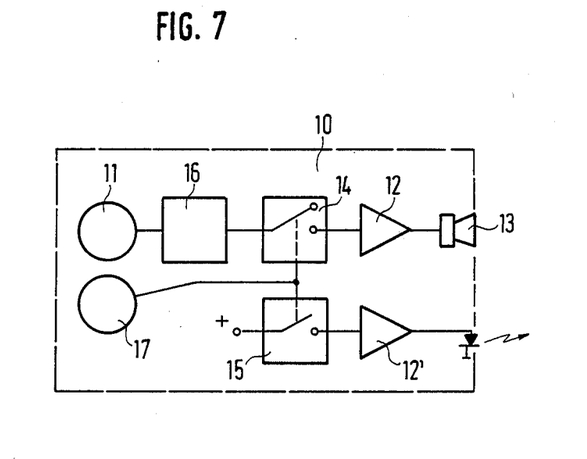

In a further preferred embodiment of the invention which is illustrated schematically in FIG. 7, a clock generator 17 triggers in a transmitter 10 both a light pulse and a sound pulse, the sound pulse being coded via a code generator 16 between oscillator 11 and electronic switch 14. If several transmitters 10 are used, each has a specially set code generator 16 so that each sound signal can be assigned to a specific transmitter 10. This correlation takes place in the computer unit.

As it is quite possible in the practice that a sound pulse can appear several times at the receiver via reflections, it is of advantage if a large supply of identification marks (codes) is available for each transmitter 10. This is done in that each code generator 16 provides the respective sound and/or light signals with varying codes known in the computer unit 23, and this supply of codes is in turn specific for each sound transmitter 10 relative to other sound transmitters 10. In this case, the computer unit 23 is designed so that the sequence of the arriving sound signals is checked as to whether the tested sequence is "possible" for correct signals or whether a sound signal must be present that has reached the receiver via detours. The latter case is at hand if a sound signal arrives before the time at which the sound signal of the transmitter triggered before or after the respective transmitter has not yet or has already arrived at the receiver.

An essential point of the present invention is, therefore, the monitoring of the sound path by light signals. This "principle" can thus be used also in conventional systems in which a cable connection exists between the test point or sound transmitter and the evaluating equipment, the sound transmitter being activated or triggered via the cable. Furthermore, in particular for test sites located close together, a single pair of light transmitters and light receivers may be sufficient for monitoring the sound path.

What is claimed:

1. A method of reducing errors when measuring movement in space of test points by means of ultrasonic signals, comprising the steps:
    (a) measuring the transit time of ultrasonic signals between sound transmitters and sound receivers;
    (b) monitoring the space between the sound transmitters and sound receivers by means of light waves to check whether obstacles from the ultrasonic waves lie in the space;
    (c) deriving the distances between said sound transmitters and sound receivers from said step of measuring only if a sound path between said sound transmitters and said sound receivers is free for light waves;
    (d) transmitting the light waves as pulse type signals and placing starting times for each ultrasonic signal at a defined time interval relative to the beginning of each pulse type signal;
    (e) deriving a starting time for an ultrasonic signal from a reception time of a light wave pulse signal emitted at a defined time interval from the ultrasonic signal for measuring the transit time of the ultrasonic signals; and
    (f) deriving the relative positions of the respective test points to the test sites from the derived distances.

2. A method according to claim 1, further including the step of setting up said sound transmitters and sound receivers at test points of unknown position in space.

3. A method according to claim 1, further including the step of setting up said sound transmitters and sound receivers at a sufficient number of test sites of known positions in space.

4. A method according to claim 1, wherein said step (c) includes the step of discarding ultrasonic signals having transit times which lie outside a given expectancy range with respect to said derivation of the distance.

5. A method according to claim 1, wherein said step (c) includes the step of discarding ultrasonic signals having amplitudes which lie outside a given expectancy range with respect to said derivation of the distance.

6. A method according to claim 1, further including the step of assigning a sound transmitter to each test point and a sound receiver to each test site.

7. A method according to claim 1 further including the steps of assigning a light transmitter to each test point and a light receiver to each test site and transmitting a light pulse substantially simultaneously with each ultrasonic signal.

8. A method according to claim 7, further including the steps measuring the illuminance ($E=\theta/A=I/r_2$) of said light waves, and setting an amplitude expectancy range as a function of the measured illuminance of the light waves.

9. A method according to claim 1, further including the steps of assigning a light receiver to each test point and a light transmitter to each test site, and transmitting an ultrasonic signal at a defined distance from the reception of a light pulse from said light transmitter.

10. A method according to claim 9, further including the step of radiating the ultrasonic signals at a defined frequency as an identification mark.

11. A method according to claim 10, further including the step of pulse-code modulating the radiated ultrasonic signals as an identification mark.

12. A method according to claim 9, further including the step of pulse-time modulating the radiated ultrasonic signals as an identification mark.

13. A method according to claim 9, further including the step of discarding a received first ultrasonic signal if it is received within a defined time sigment before or after reception of a second later emitted ultrasonic signal.

14. A method according to claim 9, further including the step of providing the light pulses with identification marks, polling the received light pulses with respect to the identification marks in each light receiver, and radiating an ultrasonic signal from a test point only if the received light pulse has a defined identification mark.

15. A method according to claim 1, further including the steps of assigning a sound transmitter to each test point and a sound receiver to each test site, using at least two sound transmitters, providing the ultrasonic signals of each sound transmitter with an identification mark and radiating the ultrasonic signals at a defined time interval from each other.

16. A method according to claim 1, wherein mean values are formed over a defined number of measured transit times of ultrasonic signals for each test point, and a received ultrasonic signal is discarded if it shows a transit time outside a defined time segment around the mean value.

17. An apparatus for reducing errors when measuring spatial movement of test points by means of ultrasonic signals, comprising:
  (a) at least one sound transmitter means for sending ultrasonic signals;
  (b) at least one sound receiver means for receiving ultrasonic signals;
  (c) light transmitter means and light receiver means for checking the sound path between the sound transmitter means and sound receiver means for obstacles and for producing a check signal if a sound path between said sound transmitters and sound receivers is free for light waves;
  (d) one of said light transmitter means and light receiver means being provided at each sound transmitter means and being provided at each sound transmitter means and being in controlling connection with sound transducers of said sound transmitter means, to radiate the ultrasonic signals at a defined time interval from a beginning of light pulses radiated by said light transmitter means, and the other of said light transmitter means and light receiver means being provided at each sound receiver means;
  (e) computer means for determining transit times of the ultrasonic signals between the at least one sound transmitter means and the at least one sound receiver means and for deriving the spatial position of each test point relative to the test sites from said transit times;
  (f) said computer means comprising means for deriving from a time difference between reception of said light pulse and reception of said ultrasonic signal the transit time of the ultrasonic signal between a sound transmitter means and a sound receiver means; and
  (g) the at least one sound transmitter means and the at least one sound receiver means being arranged at test point and test sites.

18. An apparatus according to claim 17, wherein the computer means discards ultrasonic signals having a transit time which lies outside a given expectancy range so as not to use the same for the derivation of distance between a sound transmitter means and a sound receiver means.

19. An apparatus according to claim 17, wherein the computer means discards ultrasonic signals having an amplitude which lies outside a given expectancy range so as to not to use the same for the derivation of distance between a sound transmitter means and a sound receiver means.

20. An apparatus according to claim 17, wherein a sound transmitter means is assigned to each test point and a sound receiver means is assigned to each test site.

21. An apparatus according to claim 20, wherein a light receiver means is arranged in each sound transmitter means and a light transmitter means is arranged in each sound receiver means, and each sound transmitter means comprises a sound transducer which is in a controlling connection with the light receiver means such that a sound pulse is radiated if and when the light receiver means has received light pulses from said light transmitter means.

22. An apparatus according to claim 20, wherein each sound transmitter means includes sound transducers and coding means preceding the sound transducers to code the sound signals of each sound transducer and to make them identifiable.

23. An apparatus according to claim 22, wherein at least two sound transmitter means are provided at two test points, and further comprising means for synchronizing control of the sound transmitter means so that the latter successively radiate ultrasonic pulses in a synchronized manner.

24. An apparatus according to claim 17, wherein each sound transmitter means has a sound transducer arranged jointly with a light transmitter means and further including means for jointly controlling each sound transducer and the light transmitter means.

* * * * *